3,470,267
POLYOXAZINES AS ANTISTATIC AGENT FOR HIGH MOLECULAR WEIGHT MATERIALS
Morton H. Litt, University Heights, Ohio, and Jack L. Herz, East Syracuse, N.Y., assignors to Allied Chemical Corporation, New York, N.Y., a corporation of New York
No Drawing. Filed Dec. 4, 1967, Ser. No. 687,462
Int. Cl. C09k 3/16; C08g 39/10, 41/04
U.S. Cl. 260—857   8 Claims

ABSTRACT OF THE DISCLOSURE

2 - substituted-5,6-dihydro-4H-1,3-oxazine-derived carbon-nitrogen backbone chain polymers are effective antistats for a wide variety of materials. This antistat activity can be achieved by applying the polymer to the surface of the material being treated, or in some instances, the oxazine-derived polymer can advantageously be incorporated into the material itself. This incorporation can be achieved by melting, extruding or milling the oxazine polymer and the material together or by precipitating the material being treated from a solution containing the oxazine polymers.

BACKGROUND OF THE INVENTION

This invention relates to a process for reducing the tendency of materials to acquire and retain a static electrical charge. More particularly, it relates to the imparting of antistatic properties to materials by treatment of these materials with carbon-nitrogen backbone chain polymers formed by the polymerization of 2-substituted-5,6-dihydro-4H-1,3-oxazines.

Early Greek philosophers were aware of the fact that when amber was rubbed with fur, both the amber and the fur had properties after the rubbing they did not have before. These new properties were later said to be due to "charge."

By the 18th century it was known that a wide variety of substances including, for example, amber, glass, silk and wool could be arranged in a triboelectric series and that rubbing any two of these substances together would produce opposite electrostatic charges on each. Subsequent workers have developed more quantitative methods for measuring electrostatic charge buildup and decay on a wide variety of substances. See, for example, the paper by Sashoua, J. Pol. Sci., 33, 65 (1958).

Materials having a tendency to acquire an electric charge are found virtually everywhere in the modern world. Almost everyone has experienced the annoyance of walking on a rug and then receiving a shock on putting his hand to a nearby doorknob. Similarly, clothing, particularly clothing containing a major proportion of synthetic fiber, will tend to "crackle" or cling to the body, particularly on dry days, due to electrostatic forces. Static charge buildup and subsequent discharge in the presence of inflammable solvent/air or powder/air mixtures has caused numerous fatalities and enormous property damage.

It is likewise well known that one of the significant factors in the dirtying or soiling of materials is the electrostatic attracting of dirt and dust particles. This is a significant problem not only with woven materials but also with particulate matter. For example, when removing polyethylene powder from a reactor, problems are experienced due to the tendency of the powdered polyethylene to electrostatically attract and retain contaminating dust particles from the surrounding atmosphere.

SUMMARY OF THE INVENTION

It is an objective of this invention to provide a new and improved process for reducing the tendency of materials to acquire and retain a static electrical charge. It is a further objective of this invention to provide a process for imparting antistatic properties to natural and synthetic fibers. It is a still further objective to provide a process for imparting antistatic properties to molded synthetic polymeric materials.

The antistatic properties of a given substance may properly be defined as its resistance to acquiring an electrostatic charge and its capacity to dissipate an acquired electrostatic charge quickly. The resistance to acquiring a charge and the rapidity with which a given acquired charge is dissipated are really dual aspects of the same fundamental property. The more rapidly and effectively a substance dissipates induced charge, the more resistant it is to acquiring a given charge potential. When two different materials are given the same degree of charge (electrostatic potential), the one possessing the better antistatic properties will be the one to dissipate its charge most rapidly. And conversely, the better the antistatic properties of a material, the more difficult it will be to impart to it a given electrostatic potential. The term "imparting antistatic properties," as used herein, signifies that a given material, after treatment with an oxazine-derived polymer in accordance with teaching of the instant invention, will be less prone to acquire a given charge and will dissipate a given charge more rapidly than will the same material untreated. Substances which have this ability to enhance the antistatic properties of other materials, i.e. impart antistatic properties, are known as "antistats."

As is of course well known, materials such as metals that are good electrical conductors have substantially no tendency to acquire a static charge. However, the tendency of materials which are poor electrical conductors to acquire an electrostatic charge varies enormously. For example, wood, cotton and ceramics have a relatively low tendency to acquire an electrostatic charge, i.e. they have good antistatic properties, while glass, hard rubber, nylon and wool have a relatively much higher charge acquisition tendency, i.e. poor antistatic properties. To date no really satisfactory explanation for the substantial differences in the tendency of nonconductors to acquire electrostatic charge has been forthcoming. Indeed, no generally accepted explanation exists of precisely why a substance on rubbing acquires a positive as opposed to a negative static charge.

The virtually universal nature of the problem of electrostatic charge buildup has brought forth an immense variety of substances allegedly effective as antistats. Organic polyelectrolytes of many types are widely used as antistats. The plethora of proposed substances is perforce indicative of the lack of substantial effectiveness of any of the existing antistats. For example, German Patent No. 1,206,585 describes oxazoline-derived polymers as antistats. Our tests have failed to indicate any substantial antistat activity for oxazoline-derived polymers.

It has now been found in accordance with this invention that poly(N-acyl trimethyleneimines), i.e. polymers prepared by the cationic polymerization of 2-substituted-5,6 - dihydro - 4H - 1,3 - oxazines, are effective antistatic agents. What this invention comprises, therefore, is imparting antistatic properties to a material having a tendency to acquire and retain an electrostatic charge by treating said material with oxazine-derived poly(N-acyl trimethyleneimine).

The term "treatment" as used herein contemplates either coating at least a portion of the surface of said material with an oxazine-derived polymer or incorporating oxazine-derived polymer, preferably substantially homogeneously, throughout such material.

The oxazine-derived polymers useful in the practice of the instant invention are poly(N-acyl trimethyleneimines) and may be represented by the general formula:

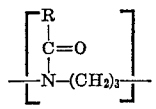

wherein R represents a substituent selected from the group consisting of aliphatic, alicyclic and aromatic hydrocarbon radicals having up to 20 carbon atoms, which hydrocarbon radicals may contain substituents which are inert under the polymerization conditions such as nitro, ether, ester, and halogen groups.

The preparation of the oxazine-derived polymers of the instant invention is effected by the polymerization of 2-substituted-5,6-dihydro-4H-1,3-oxazines of the structure:

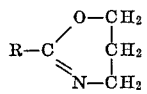

wherein R is as defined above, in the presence of a cationic catalyst as described in our copending application No. 382,343, filed July 13, 1964.

The term "aliphatic," as used hereinabove, contemplates normal and branched chain saturated, olefinic and acetylenic hydrocarbon radicals, which as indicated above, may optionally contain substituent groups which are inert under the reaction conditions. Illustrative examples of suitable radicals are methyl, ethyl, propyl, isopropyl, butyl, hexyl, heptyl, isooctyl, dodecyl, myistyl, stearyl and eicosyl; the perfluorinated analogues of the preceding alkyl groups; jointed perfluoroalkyl-alkyl radicals such as 10-perfluoro ethyl, propyl, butyl, pentyl, hexyl, heptyl, octyl and decyl-decyl $[CF_3(CF_2)_n\text{---}(CH_2)_{10}\text{---}$ wherein $n$ is 1 to 9], 5-perfluoro butyl and heptyl-pentyl and perfluoroheptyl-ethyl, propyl, butyl and hexyl; heptenyl, dodecenyl, octadecenyl, heptadecadienyl, heptadecatrienyl, acetoxylethyl and mono- and triethoxyethyl. Illustrative examples of suitable alicyclic hydrocarbon radicals are cyclopropyl, cyclopentyl, cyclohexyl, cyclododecyl, cycloheptenyl, methyl- and isopropylcyclohexyl and the like. The term "aromatic" contemplates aryl, aralkyl and alkaryl radicals. Suitable illustrative examples are o-, m- and p-ethyl-, propyl- and butyl-phenyl, phenyl, α- and β-naphthyl, benzyl, o-, m- and p-tolyl, phenylethyl, o-, m- and p-methoxyphenyl, nitrophenyl, acylphenyl, p-chlorophenyl and the like.

Preferred oxazine polymers are those wherein R is an alkyl group having from 1 to 6 carbon atoms. Particularly preferred polymers are those wherein R is methyl, ethyl or n-propyl.

For a given R group, the greater the degree of polymerization, the more effective the polymer as an antistat. Suitable polymers may be either homopolymers prepared from a single oxazine monomer, copolymers prepared by the copolymerization of a mixture of two or more oxazine monomers or mixtures of two or more oxazine-derived polymers. Ordinarily, no advantage accrues from the use of copolymers or mixtures of homopolymers.

Treatment of materials with oxazine polymers to enhance their antistatic properties in accordance with the instant invention is most effective when the oxazine polymer is deposited over substantially the entire surface of the material as an at least monomolecular film. Under circumstances where the providing of a uniform oxazine polymer film covering the entire surface of the material, hereinafter referred to as "substrate," is not possible, the effectiveness of the treatment at enhancing the antistatic properties of the substrate will be somewhat reduced. However, we have found that deposition of virtually any finite amount of oxazine polymer on the surface of the substrate being treated as either a continuous or discontinuous (e.g. speckled) phase effects a reduction in the tendency of the substrate material to acquire a static charge, the amount of the reduction being generally proportional to the percentage of the surface of the substrate material covered with oxazine polymer.

The oxazine polymer may be applied to or incorporated into the material in any suitable manner, e.g. it may be melted and applied to the surface of the substrate in molten form as a thin film which solidifies on cooling. Alternatively and preferably, the oxazine polymer may also be dissolved in a volatile solvent and sprayed or painted onto the substrate surface, thereby forming a film of oxazine polymer on evaporation of the solvent. The solvent selected will, of course, depend on the molecular weight and R group, as defined above, of the oxazine polymer, which determine its solubility, and on the chemical properties of the substrate being coated. The preferred solvent can readily be determined by the skilled artworker from among the many volatile solvents available. The only fundamental requirements being that the solvent dissolve the oxazine polymer and either not dissolve the substrate or at least not dissolve it sufficiently rapidly to adversely affect the substrate surface finish before it evaporates. Suitable solvents include water, methanol, ethanol, isopropanol, butanol, acetone, methyl ethyl ketone, butyl acetate, dimethyl formamide, 1,4-dioxan, tetrahydrofuran, toluene, benzene, chloroform and trichloroethylene. Application of the oxazine polymer solution in the form of a spray is particularly advantageous when the substrate is fibrous as in the case of woven or knitted fabrics.

Where the substrate being treated will melt without decomposition, a molten mixture comprising the oxazine polymer and the molten substrate may be formed. On solidification by cooling, the alloy or physical blend, comprising the substrate with the oxazine polymer distributed therethrough, will be found to exhibit substantially greater antistatic properties than the unalloyed substrate. The antistatic polymer may also be incorporated into a substrate by precipitating the substrate from a solution containing the oxazine-derived polymer or by spraying a solution of polymer on to the substrate, evaporating the solvent and extruding the coated substrate. For example, when a chloroform solution of poly (N-acetyl trimethyleneimine) is sprayed onto nylon 6 pellets, the chloroform evaporated and the pellets then extruded into a fiber, the oxazine polymer is incorporated in the fiber. Under these circumstances, where the oxazine polymer is substantially homogeneously distributed through the substrate, rather than being deposited on the surface thereof, the reduction in the charge accumulation tendency of the substrate is dependent upon the substrate and upon the amount of oxazine polymer incorporated therein, the more oxazine polymer incorporated, the greater the antistat effect. The upper limit on the amount of oxazine polymer which can advantageously be incorporated into the substrate in this fashion is generally limited only to the point at which it commences to adversely affect the physical properties of the substrate.

Substrate materials which may suitably be treated with oxazine polymers in accordance with the instant invention include synthetic materials such as nylon 6 and 66, either solid or fibrous, rayon, acrylic and polyester fibers, cellophane, polyethylene, polyethylene terephthalate, polyvinyl alcohol, polyvinyl acetate, polyvinyl chloride, Lucite, and natural materials such as gutta percha, hard rubber, amber and wool.

Inasmuch as the materials which exhibit a tendency towards the accumulation of an electrostatic charge are poor conductors of electricity, such electrostatic charge accumulation, and likewise antistat activity, is generally considered by authorities in the field to be predominantly a surface phenomenon. However, at least under some circumstances this may not be the case. For example, we have found that strips of polyvinyl chloride having oxazine polymers homogeneously incorporated therein by mixing molten PVC and oxazine polymer before casting of the strips have superior antistat properties to unalloyed PVC. This antistat activity could be due to that portion of the incorporated oxazine polymer present near the strip surface. However, extraction of such alloy strips with chloroform, which should remove any oxazine polymer present at the surface of strip, does not significantly reduce the antistat properties of the alloyed strip.

While we do not wish to be bound by any particular mechanistic interpretation for the antistat activity of the oxazine polymers of the instant invention, it is believed that they dissipate a substantial portion of the negative or positive electrostatic charge induced on the substrate by transfer of an electron or proton, respectively, to a first oxazine polymer chain and thence rapidly along the chain via an overlap of the carbonyl bond orbitals of the adjoining amide groups. Only occasional overlap between chains is then necessary to get good charge dissipation. Thus, polymer molecules which can easily form conformers in which there is carbonyl bond orbital overlap should be good at dissipating electrostatic charges. A basis for this interpretation is found in the fact that, using Courtauld's molecular models, no conformers could be made using oxazoline derived polymers in which adjacent amide carbonyl functions could get close enough together to achieve orbital overlap. On the other hand, such carbonyl overlap conformers are readily assumed by oxazine derived polymers. Additional basis is furnished by the fact that among oxazine-derived polymers, substantially greater antistat activity is shown by oxazine polymers which are amorphous and of low glass transition temperature than by more crystalline oxazine polymers or by ones of higher glass transition temperature. For example, poly (N-hexanoyl trimethylene imine), which is prepared from 2-pentyl oxazine, has a glass transition temperature of $-16°$ C. and it is more effective as an antistat than the polymer prepared from tert-butyloxazine which polymer has a glass transition temperature of $+47°$ C. Oxazoline polymers, which show little or no antistat activity in our tests, are generally crystalline materials of high melting temperatures or high glass transition temperatures. For example, poly (N-hexanoyl ethylene imine), the polymer prepared from 2-pentyl oxazoline, has a melting temperature of 175° C.

If our mechanistic interpretation for charge dissipation is correct, it follows that only those molecules which are unable to assume the conformer in which there is carbonyl orbital overlap will be very effective antistats. At temperatures below its glass transition temperature the polymer molecules are too rigid to assume the configuration required for orbital overlap. Therefore, the preferred oxazine-derived polymers are those having a glass transition temperature below the temperature at which it is desired to impart antistat properties to the substrate.

The invention can be more fully understood by reference to the following examples. All parts are parts by weight unless otherwise expressly noted.

EXAMPLE 1

A number of oxazine-derived polymers and poly (N-acetyl ethylene imine) (prepared from 2-methyloxazoline) were dissolved in chloroform or methanol to form 5% solutions. 1″ x 13″ swatches of scrubbed nylon 6 taffeta were impregnated with these polymers by soaking the swatch in the polymer solution and evaporating off the solvent. The impregnated swatches were equilibrated for 1 day at the 50% relative humidity prevailing during the charge decay half-life test, connected to a Type R-1019 Rothschild Static Voltmeter and given an applied static charge of 100 v. from a high voltage source within the meter. The charge decay half-life was then determined. The charge decay half-life ($t-\frac{1}{2}$) is the time required for the sample, which is connected to the ground, to loose static charge until it has a potential of only 50 volts. The less the $t-\frac{1}{2}$ the greater the antistatic properties of the material. Results are tabulated below. Sample temperature was about 23° C.

| Polymer deposited on nylon 6 | $t-\frac{1}{2}$ (sec.) |
|---|---|
| None | 300 |
| Poly (N-acetyl ethyleneimine) | 590 |
| Poly (N-acetyl trimethyleneimine) | 0.5 |
| Poly (N-propionyl trimethyleneimine) | 1.0 |
| Poly (N-butyryl trimethyleneimine) | 15 |
| Poly (N - 2,2 - dimethylpropionyl trimethyleneimine) | 280 |
| Poly (N-hexanoyl trimethyleneimine) | 3.5 |
| Poly (N-undecanoyl and tridecanoyl trimethyleneimine) mixture | 20 |
| Poly (N-4,4,5,5-tetrafluoro - 5 - perfluoroisopropoxy octanoyl trimethyleneimine | 53 |

As it is apparent, oxazine derived polymer-coated nylon 6 taffeta has substantially better antistatic properties than uncoated or oxazoline derived polymer-coated nylon.

EXAMPLE 2

Samples of polyethylene terephthalate film were coated with poly (N-acetyl trimethyleneimine) or poly (N-acetyl ethyleneimine) by spraying with a 20% acetone solution of one or the other of the two polymers and evaporating off the acetone. The film samples were given an applied static charge of 250 volts and $t-\frac{1}{2}$ determined as in Example 1. An uncoated comparison sample had a $t-\frac{1}{2}$ of 294 sec. The oxazoline-derived polymer coated sample had a $t-\frac{1}{2}$ of 308 sec., substantially identical. The sample coated with poly (N-acetyl trimethyleneimine), the oxazine-derived polymer gave an average $t-\frac{1}{2}$ of only 4.1 sec.

EXAMPLE 3

The effectiveness of the oxazine-derived polymers at inhibiting static charge buildup when incorporated into a polymer is shown below. Weighed portions of molten polyvinyl chloride and molten oxazine derived polymer were homogeneously mixed and molded into strips. A steel bar was rolled down these strips which were inclined at 30°; the strips were connected to ground and to a Rothschild Static Voltmeter (Type R-1019) as in Example 1. The induced strip potential was measured after 4 successive rolls. The lower the potential, the more effective is the polymer incorporated into the PVC at inhibiting static charge buildup.

| Polymer added | Percent by weight oxazoline or oxazine polymer added | 4-roll induced pot. (volts) |
|---|---|---|
| None | | 580 |
| Poly (N-acetyl trimethyleneimine) | 6.8 | 33 |
| Poly (N-hexanoyl trimethyleneimine) | 8.1 | 250 |

EXAMPLE 4

A surface coating of oxazine-derived polymers of the structure:

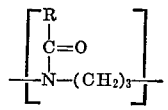

having the following R groups is effective at inhibiting electrostatic charge buildup on nylon taffeta: R=heptyl, isooctyl, stearyl, eicosyl, perfluoro propyl and hexyl, 10-perfluoroethyl decyl, dodecenyl, acetoxyethyl, cyclohexyl, p-tolyl, benzyl and p-chlorophenyl.

EXAMPLE 5

Poly (N-acetyl trimethylenimine) inhibited static charge buildup when deposited from a methanol solution onto the following substrates:

| Substrate | Substrate form |
|---|---|
| Rayon | Fabric. |
| Cotton/polyester blend | Fabric. |
| Acrylic | Fabric. |
| Wool | Fabric. |
| Cellophane | Film. |
| Polyethylene | Strip. |
| Lucite | Strip. |
| Gutta percha | Strip. |
| Hard rubber | Strip. |
| Amber | Strip. |
| Nylon 66 | Strip. |
| Nylon 610 | Strip. |
| Polypropylene | Powder. |

EXAMPLE 6

Five parts of poly (N-acetyl trimethyleneimine) was dissolved in 25 parts of chloroform. The chloroform polymer solution was added to 100 parts of nylon 6 pellets and the chloroform evaporated off. The polymer coated, nylon 6 pellets were then extruded and drawn into a fiber. A fabric woven from this polymer containing nylon had substantially better resistance to static charge accumulation and soiling than fabric prepared in the same fashion from untreated nylon 6.

Various modifications will be apparent to one skilled in the art, and it is not intended that this invention be limited to the details in the specific examples presented by way of illustration. Accordingly, the scope of the invention is limited only by the appended claims.

We claim:

1. A process for imparting antistatic properties to a material selected from the group consisting of cellulosics, polyesters, acrylics, wool, polyethylene, polypropylene, rubber, polyamides and polyvinylchloride having a tendency to acquire and retain an electrostatic charge comprising treating said material with an amount effective to impart antistatic properties of a polymer having the structure:

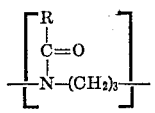

wherein R represents a substituent selected from the group consisting of aliphatic, alicyclic and aromatic hydrocarbon radicals and substituted hydrocarbon radicals having up to 20 carbon atoms.

2. A process in accordance with claim 1 wherein said R is an alkyl group having from 1 to 6 carbon atoms.

3. A process in accordance with claim 2 wherein said alkyl group is methyl, ethyl or n-propyl.

4. A process in accordance with claim 1 wherein said treatment comprises coating at least a portion of the surface of said material.

5. A process in accordance with claim 1 wherein said treatment comprises forming a molten mixture comprising said material and said polymer and thereafter solidifying said mixture by cooling.

6. A process in accordance with claim 1 wherein said treatment comprises precipitating said material from a solution containing said polymer.

7. A process in accordance with claim 1 wherein said material is selected from the group consisting of nylon 6 and polyvinyl chloride.

8. A composition of matter comprising an oxazine derived polymer having the structure:

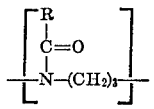

wherein R represents a substituent selected from the group consisting of aliphatic, alicyclic and aromatic hydrocarbon radicals and substituted hydrocarbon radicals having up to 20 carbon atoms, and a thermoplastic selected from the group consisting of nylon 6, nylon 66, nylon 610 and polyvinyl chloride said oxazine derived polymer being present in an amount effective to impart antistatic properties to the thermoplastic polymers.

References Cited

UNITED STATES PATENTS

| | | | |
|---|---|---|---|
| 2,272,489 | 2/1942 | Ulrich | 260—239 |
| 3,198,754 | 8/1965 | Ahlrecht | 260—2 |
| 3,300,274 | 1/1967 | Pittman | 260—2 |
| 3,373,194 | 5/1968 | Fuhrmann | 260—559 |

FOREIGN PATENTS 1,206,585  9/1965  Germany.

OTHER REFERENCES

Tomalia, and Sheetz, Homopolymerization of 2-alkyl and 2-aryl-2-oxazolines. Journal of Polymer Science, part A–1, vol. 4, pp. 2253–2265 (1966).

MURRAY TILLMAN, Primary Examiner

P. LIEBERMAN, Assistant Examiner

U.S. Cl. X.R.

117—161, 138.8, 139, 145; 260—887, 823, 901, 860, 897, 2, 899, 3, 13